United States Patent
Cipollini et al.

(10) Patent No.: US 7,112,386 B2
(45) Date of Patent: Sep. 26, 2006

(54) MEMBRANE ELECTRODE ASSEMBLIES WITH HYDROGEN PEROXIDE DECOMPOSITION CATALYST

(75) Inventors: Ned E. Cipollini, Enfield, CT (US); David A. Condit, Avon, CT (US); Jared B. Hertzberg, New Haven, CT (US); Thomas D. Jarvi, Manchester, CT (US); James A. Leistra, Simsbury, CT (US); Michael L. Perry, South Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 30 days.

(21) Appl. No.: 10/235,074

(22) Filed: Sep. 4, 2002

(65) Prior Publication Data

US 2004/0043283 A1    Mar. 4, 2004

(51) Int. Cl.
*H01M 4/90* (2006.01)
*H01M 4/92* (2006.01)

(52) U.S. Cl. .............................. 429/41; 429/30; 429/40

(58) Field of Classification Search ............... 429/30, 429/40–44; 502/101
See application file for complete search history.

(56) References Cited

U.S. PATENT DOCUMENTS

| | | | |
|---|---|---|---|
| 4,438,216 A * | 3/1984 | Kampe et al. ............... | 502/101 |
| 5,342,494 A | 8/1994 | Shane et al. | |
| 5,472,799 A | 12/1995 | Watanabe | |
| 5,480,518 A | 1/1996 | Shane et al. | |
| 5,523,181 A | 6/1996 | Stonehart et al. | |

(Continued)

FOREIGN PATENT DOCUMENTS

| | | |
|---|---|---|
| AU | 1013703 | 12/1965 |
| EP | 0309337 | 3/1980 |

(Continued)

OTHER PUBLICATIONS

Self-Humidifying Electrolyte Membranes for Fuel Cells, Preparation of Highly Dispersed Ti 02 Particles in Nafion 112, Journal of The Electrochemical Society, 150 (2003), Authors: Uchida et al., no month.

(Continued)

*Primary Examiner*—Tracy Dove
(74) *Attorney, Agent, or Firm*—Bachman & LaPointe, P.C.

(57) ABSTRACT

A membrane electrode assembly includes an anode including a hydrogen oxidation catalyst; a cathode; a membrane disposed between the anode and the cathode; and a peroxide decomposition catalyst positioned in at least one position selected from the group consisting of the anode, the cathode, a layer between the anode and the membrane and a layer between the cathode and the membrane wherein the peroxide decomposition catalyst has selectivity when exposed to hydrogen peroxide toward reactions which form benign products from the hydrogen peroxide. The peroxide decomposition catalyst can also be positioned within the membrane. Also disclosed is a power-generating fuel cell system including such a membrane electrode assembly, and a process for operating such a fuel cell system.

51 Claims, 3 Drawing Sheets

U.S. PATENT DOCUMENTS

| | | | |
|---|---|---|---|
| 5,672,439 A | 9/1997 | Wilkinson et al. | |
| 5,766,787 A | 6/1998 | Watanabe | |
| 5,795,669 A | 8/1998 | Wilkinson et al. | |
| 5,800,938 A | 9/1998 | Watanabe | |
| 5,874,182 A | 2/1999 | Wilkinson et al. | |
| 5,981,097 A * | 11/1999 | Rajendran | 429/33 |
| 6,242,135 B1 | 6/2001 | Mushiake | |
| 6,309,769 B1 | 10/2001 | Haug | |
| 6,335,112 B1 * | 1/2002 | Asukabe et al. | 429/30 |
| 2002/0058172 A1 | 5/2002 | Datz et al. | |
| 2003/0008196 A1* | 1/2003 | Wessel et al. | 429/40 |
| 2003/0059664 A1* | 3/2003 | Menjak et al. | 429/34 |

FOREIGN PATENT DOCUMENTS

JP   2001118591 A  *  4/2001

OTHER PUBLICATIONS

Self-Humidifying Polymer Electrolyte Membranes for Fuel Cell, 1996, Yamanashi University, Authors: Watanabe et al., no month.

Direct Internally-Humidified Electrolyte Membranes for Polymer Electrolyte Fuel Cells, ECS Extended Abstracts, 1994, Authors: Watanabe et al., no month.

* cited by examiner

MEMBRANE ELECTRODE ASSEMBLIES WITH HYDROGEN PEROXIDE DECOMPOSITION CATALYST

BACKGROUND OF THE INVENTION

The present invention relates to membrane electrode assemblies and, more particularly to such assemblies for fuel cells, especially for proton exchange membrane (PEM) fuel cells.

PEM fuel cells include a membrane electrode assembly (MEA) which typically includes an anode and cathode on either side of a membrane wherein fuel is fed to the anode, and oxygen to the cathode, and the resulting reaction generates electricity.

Unfortunately, current membrane technology produces stacks of cells including such membranes having useful lifetimes as short as about 1,000 hours which is well short of ultimate goals. When a membrane fails, failure occurs suddenly and ends the useful life of the cell, thereby necessitating immediate intervention. Cells can be excised from a stack for replacement, but will require great care and nevertheless will be accompanied by potential loss of adjacent cells. This type of replacement process is not a viable field service, and it is likely that once membrane failure begins, a stack replacement will be required.

It is clear that the need remains for membranes for fuel cell assemblies and the like which have longer useful lifetimes.

It is therefore the primary object of the present invention to provide a membrane electrode assembly having enhanced useful lifetime.

Other objects and advantages will appear hereinbelow.

SUMMARY OF THE INVENTION

In accordance with the present invention, the foregoing objects and advantages have been readily attained.

According to the invention, a membrane electrode assembly is provided which comprises an anode including a hydrogen oxidation catalyst; a cathode; a membrane disposed between said anode and said cathode; and a peroxide decomposition catalyst positioned in at least one position selected from the group consisting of said anode, said cathode, a layer between said anode and said membrane, and a layer between said cathode and said membrane wherein said peroxide decomposition catalyst has selectivity when exposed to hydrogen peroxide toward reactions which form benign products from said hydrogen peroxide.

In accordance with a further embodiment of the present invention, a power-producing fuel cell system is provided which comprises an anode including a hydrogen oxidation catalyst; a cathode; a membrane disposed between said anode and said cathode; and a peroxide decomposition catalyst positioned in at least one position selected from the group consisting of said anode, said membrane, said cathode, a layer between said anode and said membrane and a layer between said cathode and said membrane, wherein said peroxide decomposition catalyst has selectivity when exposed to hydrogen peroxide toward reactions which form benign products from said hydrogen peroxide, and wherein said peroxide decomposition catalyst is selected from the group consisting of Pd, Ir, C, Ag, Au, Rh, Ru and combinations thereof.

In further accordance with the present invention, a process is provided for operating a fuel cell, which process comprises the steps of providing a fuel cell including a membrane electrode assembly comprising an anode including a hydrogen oxidation catalyst; a cathode; a membrane disposed between said anode and said cathode; and a peroxide decomposition catalyst positioned in at least one position selected from the group consisting of said anode, said membrane, said cathode a layer between said anode and said membrane and a layer between said cathode and said membrane, wherein said peroxide decomposition catalyst has selectivity when exposed to hydrogen peroxide toward reactions which form benign products from said hydrogen peroxide; and feeding a hydrogen-containing fuel to said anode and an oxygen source to said cathode so as to operate said fuel cell and generate hydrogen peroxide in the presence of said peroxide decomposition catalyst whereby said hydrogen peroxide is decomposed to said benign products.

BRIEF DESCRIPTION OF THE DRAWINGS

A detailed description of preferred embodiments of the present invention follows, with reference to the attached drawings, wherein.

DETAILED DESCRIPTION

The invention relates to a membrane electrode assembly and process for operating a PEM fuel cell containing same wherein the membrane is protected from attack by hydrogen peroxide decomposition products that can decompose or erode the cell membrane and reduce the life of the cell.

In accordance with the present invention, it has been found that the limitations on useful life of proton exchange membrane (PEM) fuel cells is often the useful life of the membrane. Over the lifetime of use of such membranes, it is found that the membranes are eroded until they fail. In accordance with the present invention, it has been found that this erosion is due to the harmful decomposition of hydrogen peroxide at or within the membrane, which generates radicals and other harmful products that decompose the membrane. In accordance with the present invention, such harmful products of decomposition of peroxides are avoided through incorporation of a peroxide decomposition catalyst in the membrane electrode assembly, and useful life of the membrane and cell containing same are extended.

Figure 1:
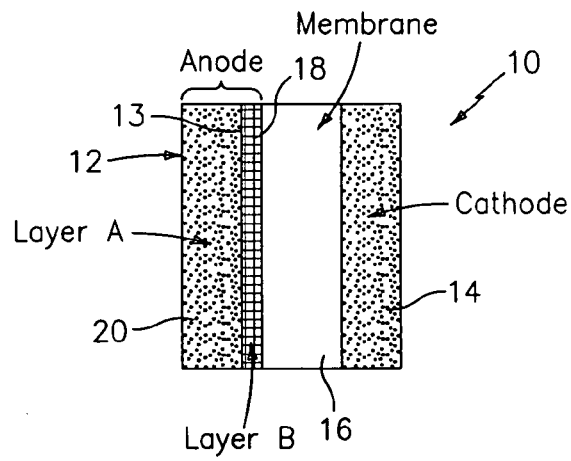
FIG. 1 illustrates a two-layer anode configuration of a membrane electrode assembly in accordance with the present invention.

FIG. 1 illustrates a portion of a fuel cell including a membrane electrode assembly (MEA) 10 in accordance with the present invention. MEA 10 includes an anode 12, a cathode 14 and a membrane 16 positioned therebetween. In normal operation of a fuel cell, a hydrogen-containing fuel is fed to anode 12, and an oxygen source is fed to cathode 14, and reactions occur which generate a potential across membrane 16 as desired.

In accordance with the present invention, it has also been found that hydrogen peroxide is frequently created at anode 12 by partial reduction of oxygen. At the anode potential, the surface of typical hydrogen oxidation catalyst positioned in the anode is such that oxygen which comes into contact with the catalyst in this position has a high chance of being reduced to hydrogen peroxide. Oxygen can come into contact with the anode catalyst through oxygen crossover or through an air-bleed intended to mitigate CO-poisoning, or through other mechanisms.

Hydrogen peroxide can decompose to benign products, for example water and oxygen. Under certain conditions, however, hydrogen peroxide decomposes to products which can be damaging to the membrane. For example, hydrogen peroxide can react with an impurity ion or high surface area particulate to generate a .OH radical, which can attack the polymer of the membrane. It is believed in accordance with the present invention that such radicals are formed when hydrogen peroxide reaches the membrane, and that such radicals are responsible for chemical erosion or consumption of the membrane.

In accordance with the present invention, a peroxide decomposition catalyst is incorporated into membrane electrode assembly 10 and is advantageously positioned to cause benign decomposition of hydrogen peroxide, preferably into water and oxygen. In accordance with the invention, the peroxide decomposition catalyst can be positioned in one or more locations including within the anode, within the cathode, within the membrane itself, as a layer between the anode and the membrane, as a layer between the cathode and the membrane and in combinations of these locations.

The peroxide decomposition catalyst in accordance with the present invention is preferably one selected to have activity toward benign decomposition of hydrogen peroxide. Benign decomposition is considered to be that which leads to products that are not harmful to the structure of membrane. Thus, benign decomposition includes that which decomposes hydrogen peroxide to form water and oxygen. Specific decomposition which is not considered benign, and which is prevented by the catalyst incorporation of the present invention, is decomposition of hydrogen peroxide to form radicals such as .OH and .OOH.

Peroxide decomposition catalysts in accordance with the present invention are preferably those which do not allow escape or generation of free radicals from hydrogen peroxide.

In accordance with the present invention, the peroxide decomposition catalyst can include conducting and non-conducting materials, preferably those which are electrochemically stable within a fuel cell environment. Preferably, the peroxide decomposition catalyst is an element or composition containing an element selected from the group consisting of Pt, Pd, Ir, C, Ag, Au, Rh, Ru, Sn, Si, Ti, Zr, Al, Hf, Ta, Nb, Ce and combinations thereof, preferably Pt, Pd, Ir, C, Ag, Au, Rh, Ru and combinations thereof. Such catalysts are further preferably provided on a support which may advantageously be selected from the group consisting of oxides of Ru, Sn, Si, Ti, Zr, Al, Hf, Ta, Nb and Ce, as well as zeolites, carbon and mixtures thereof.

As used herein, a catalyst is considered to be within an electrode or the membrane when it is incorporated as a layer into the electrode or membrane, or is dispersed through the electrode or membrane, or both.

In accordance with one aspect of the present invention, peroxide decomposition catalyst is preferably positioned adjacent to the anode and/or cathode of a membrane electrode assembly so as to provide for benign decomposition of hydrogen peroxide. As used herein, the term "adjacent" includes physically adjacent positioning to, as well as positioning in electric communication with, the electrode.

In the embodiment illustrated in FIG. 1, peroxide decomposition catalyst is provided as a layer 18 positioned on a membrane-facing side or surface 13 of anode 12.

Still referring to FIG. 1, in this embodiment, anode 12 includes a first layer or layers 20 which typically includes hydrogen oxidation catalyst, and layer 18 containing the peroxide decomposition catalyst in accordance with the present invention. In this embodiment, layer 18 is adjacent to surface 13 of anode 12.

The hydrogen oxidation catalyst in layer 20 of anode 12 can be any catalyst having suitable activity or selectivity toward the desired reactions. Examples of suitable hydrogen oxidation catalyst include platinum and platinum-ruthenium catalyst, and this catalyst can preferably be supported on a suitable support such as carbon.

Other catalyst(s) can be incorporated into layer 18, along with the peroxide decomposition catalyst, so long as sufficient selectivity is provided in layer 18 to provide a desired level of benign destruction of hydrogen peroxide.

It may also be preferable that layer 18 be provided having a high ionomer content, preferably sufficiently high that this layer is substantially non-porous, having a porosity of less than about 20%. Layer 18 is further preferably relative thin, and is provided having a low volume fraction of catalyst so as to minimize ionic resistance due to the added layer.

Layers 18, 20 in one embodiment are preferably provided in electrical continuity, and such electrical continuity between these layers can greatly simplify manufacturing relative to an electrically insulated layer. Further, it is preferred to place layer 18 as close to anode 12 as possible since this interface between layers is where hydrogen peroxide is expected to most aggressively attack the membrane.

In accordance with the embodiment of FIG. 1, when membrane electrode assembly 10 is in operation, any hydrogen peroxide generated in anode 12, or at surface 13 or the interface between anode 12 and layer 18, is in the presence of peroxide decomposition catalyst in layer 18, and is broken down via benign pathways before entering membrane 16 as desired. This advantageously serves to extend the useful lifetime of membrane 16 within assembly 10, thereby enhancing product life as desired in accordance with the present invention.

Figure 2:
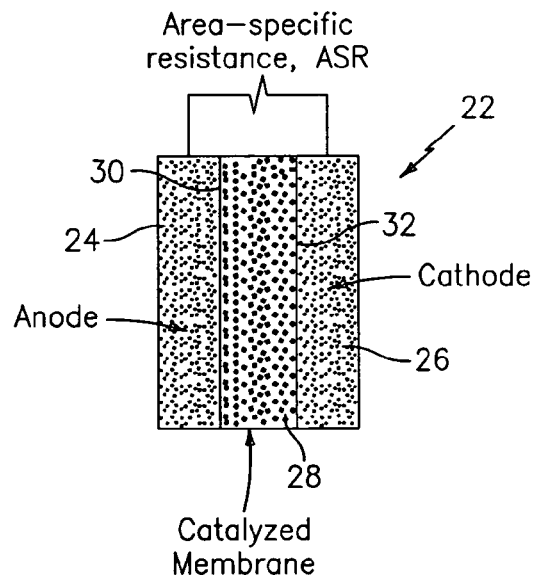
FIG. 2 illustrates a membrane electrode assembly in accordance with the present invention wherein the membrane contains catalyst.

Turning now to FIG. 2, an alternative embodiment of a membrane electrode assembly 22 in accordance with the present invention is illustrated. FIG. 2 shows membrane electrode assembly 22 having anode 24, cathode 26 and a catalyzed membrane 28 which contains the desired peroxide decomposition catalyst dispersed therethrough. This catalyst, in similar fashion to the layer embodiment of FIG. 1, advantageously serves to decompose hydrogen peroxide via benign pathways before the peroxide enters membrane 28 as desired.

In accordance with the embodiment of FIG. 2, it should be appreciated that catalyst disposed therethrough may or may not be electrically insulating. An insulating or non-conductive layer may result from properties of the particles of catalyst and/or the support, or may result in a conducting layer having a range of area-specific electronic resistance of between about 200 and about 2000 Ohm-cm$^2$. Such a range gives rise to a negligible parasitic current, on the order of 0.5–5 mA/cm$^2$. This configuration of catalyst serves to greatly simplify manufacturing and does not meaningfully impact upon cell performance.

In further accordance with the embodiment of FIG. 2, and as shown, it is preferred that the membrane be catalyzed throughout the entire membrane, including and up to a surface 30 facing anode 24 and a surface 32 facing cathode 26. This can be accomplished, for example, by dispersing catalyst through membrane 28 as illustrated. This advantageously provides membrane 28 with protection from hydrogen peroxide generated at either anode 24 or cathode 26. It is noted that normal operating conditions at cathode 26 do not lead to substantial generation of hydrogen peroxide. Nevertheless, even in trace amounts, such hydrogen peroxide can lead to substantial membrane decomposition over time, and the catalyzed membrane in accordance with this embodiment is protected from hydrogen peroxide from either anode 24 or cathode 26, as is desired in accordance with the present invention.

In the embodiment of FIG. 2, since a weak electronic connection between anode 24 and cathode 26 is tolerated, loading of catalyst in the membrane is less restricted than it would be if the catalyzed membrane were to be electrically isolated.

In accordance with a further embodiment of the invention (See FIG. 3), a membrane electrode assembly 34 is provided having an anode 36, a cathode 38 and a membrane 40 positioned therebetween. In this embodiment, in addition to the hydrogen oxidation catalyst positioned in anode 36 and the oxygen reduction catalyst which may be present in cathode 38, peroxide decomposition catalyst is advantageously dispersed through anode 36 and cathode 38 as well. Mixing of catalyst in the electrodes in accordance with this embodiment of the present invention can advantageously allow for positioning of peroxide decomposition catalyst as close as possible to its source, that is, the hydrogen oxidation and/or oxygen reduction catalyst. As set forth above, the need for peroxide decomposition catalyst in cathode 38 is generally reduced as compared to anode 36 since operating conditions in cathode 38 do not generally lead to the formation of hydrogen peroxide. Thus, peroxide decomposition catalyst is preferably present in the anode in an amount greater than that in the cathode. It should be appreciated that this embodiment of the present invention is particularly effective at providing for long membrane life since benign decomposition of hydrogen peroxide is provided for at both sides of membrane 40 as desired.

Figure 3:
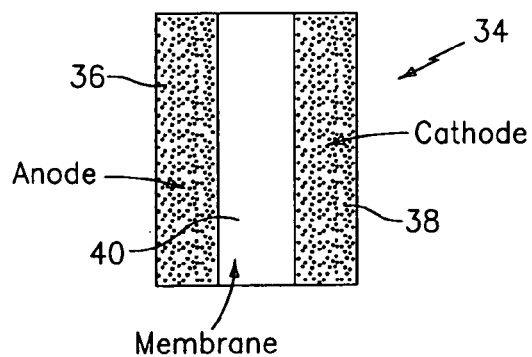
FIG. 3 illustrates a further embodiment of the present invention wherein catalyst is dispersed through the anode and cathode.

Of course, it should also be appreciated that the peroxide decomposition catalyst location as illustrated in each of FIGS. 1, 2 and 3 can be combined in other manners. Further, in connection with the embodiment of FIG. 1, peroxide decomposition catalyst can also be positioned in a layer between membrane 16 and cathode 14, if desired and/or necessary, as shown in FIG. 4.

Figure 4:
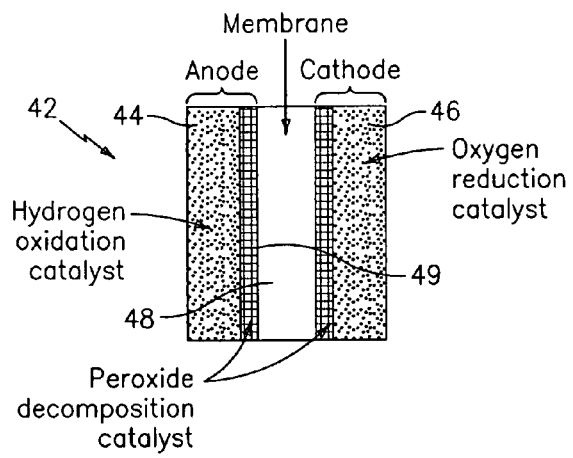
FIG. 4 illustrates an embodiment of the present invention wherein catalyst is provided in layers between the membrane and anode and between the membrane and cathode.

FIG. 4 illustrates a further membrane electrode assembly 42 in accordance with the present invention including anode 44, cathode 46 and membrane 48 disposed therebetween. In this embodiment, anode 44 includes hydrogen oxidation catalyst disposed therein, and cathode 46 includes oxygen reduction catalyst disposed therein, as is well known to a person of ordinary skill in the art. Further, in this embodiment, anode 44 includes a layer 49 containing peroxide decomposition catalyst in accordance with the present invention, and cathode 46 includes a layer 50 of peroxide decomposition catalyst in accordance with the present invention. As described above, this embodiment advantageously serves to provide for benign decomposition of peroxide generated through either electrode of assembly 42 as desired in accordance with the present invention, and serves to enhance the useful lifetime of membrane 48.

Figure 5:
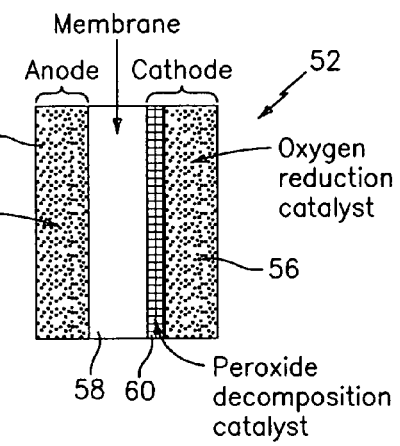
FIG. 5 illustrates a further embodiment of the present invention wherein catalyst is provided only in a layer between the cathode and membrane.

Turning now to FIG. 5, a further membrane electrode assembly 52 in accordance with the present invention is illustrated, which includes anode 54, cathode 56 and membrane 58 disposed therebetween. In this embodiment, cathode 56 includes a layer 60 of peroxide decomposition catalyst, and this configuration may be desired when membrane electrode assembly 52 is to be operated in such a fashion that peroxide is expected to be generated within cathode 56.

Figure 6:
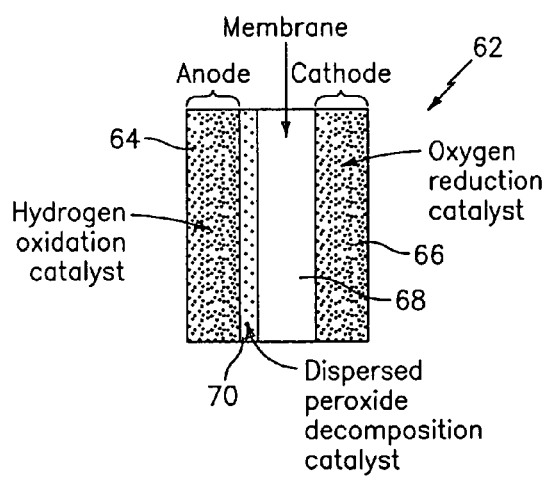
FIG. 6 illustrates an embodiment of the present invention wherein peroxide decomposition catalyst is provided in a dispersed layer between the membrane and anode.

Turning now to FIG. 6, still another embodiment of the present invention is illustrated. In this embodiment, peroxide decomposition catalyst is disposed in a separate layer by being dispersed through the layer. Thus, FIG. 6 shows a membrane electrode assembly 62 in accordance with the present invention including anode 64, cathode 66 and membrane 68 positioned therebetween. In this embodiment, however, a separate layer 70 is provided in the form of suitable peroxide decomposition catalyst dispersed through suitable layer material. For example, such a layer of catalyst can be disposed within the membrane by impregnation into the membrane material to a desired depth from either or both sides or surfaces of the membrane. In this embodiment, wherein electrical conductivity is not required, the catalyst density can advantageously be lower than in other configurations. It should of course be appreciated that FIG. 6 shows a configuration with a layer containing dispersed catalyst between the anode and membrane of the assembly. Such a dispersed catalyst layer can likewise be positioned between the cathode and the membrane if desired, either alone or in combination with the layer as illustrated in FIG. 6.

In order to provide maximum protection or shielding of the membrane from hydrogen peroxide, the intermixed anode and cathode of FIG. 3, containing peroxide decomposition catalyst, can be combined with two-layer electrodes of FIG. 1, for either the anode or the cathode or both, so as to decompose all potential sources of peroxide entering the membrane.

In further accordance with the present invention, it has also been found, advantageously, that the use of peroxide decomposition catalysts which are supported on oxides can be exploited to alter the water transfer characteristics of the anode and cathode, for example to make the anode more hydrophilic than the cathode.

As set forth above, various types of peroxide decomposition catalyst are desirable. It has been found that silver and gold particles are particularly advantageous at providing the desired peroxide decomposition, and such catalyst is particularly effective when deposited over carbon. Carbon itself is also a very useful peroxide decomposition catalyst. Of course, many other materials are also suitable for use as peroxide decomposition catalyst as described above.

In accordance with one embodiment of the present invention, the peroxide decomposition catalyst may be platinum, and in some instances may be the same as the hydrogen oxidation catalyst. In such embodiments, it is preferred that the peroxide decomposition catalyst be positioned in a dispersed form. The optimum Pt interparticle distance in this layer depends upon location and thickness within the space between the anode and cathode and thickness of the adjacent membrane, and is selected so as to promote benign decomposition of peroxide as desired.

In accordance with a further aspect of the present invention, the membrane electrode assembly can advantageously be provided with peroxide decomposition catalysts in the anode, membrane, cathode, layers between the anode and membrane, and/or layers between the cathode and the membrane, and when peroxide decomposition catalyst is so positioned, a particularly preferred group of peroxide decomposition catalyst includes elements or compositions containing elements selected from the group consisting of Pd, Ir, C, Ag, Au, Rh, Ru, Sn, Si, Ti, Zr, Al, Hf, Ta, Nb, Ce and combinations thereof, preferably Pd, Ir, C, Ag, Au, Rh, Ru and combinations thereof. This catalyst may further be supported on support as identified above.

Also as set forth above, the membrane electrode assembly described herein is particularly advantageous when utilized in a power-producing fuel cell system. In such a configuration, the electrode assembly is positioned in a stack of similar components, and the stack is fed with fuel that is preferably rich in hydrogen, as well as an oxidant or oxygen source. In addition to the well known reactions to generate power, this feeding of components to the fuel cell will also form hydrogen peroxide which, in accordance with the invention, is to be decomposed along benign pathways. In accordance with the present invention, the peroxide decomposition catalyst advantageously serves to decompose this hydrogen peroxide along benign pathways, preferably to generate water and oxygen, so that the membrane of the membrane electrode assembly is protected from attack by radicals or other harmful peroxide decomposition products, and membrane life is extended.

The electrode assembly of the present invention is referred to herein as a membrane electrode assembly. It should of course be appreciated that this term is intended to specifically include unitized electrode assemblies (UEA) as well.

Figure 7:
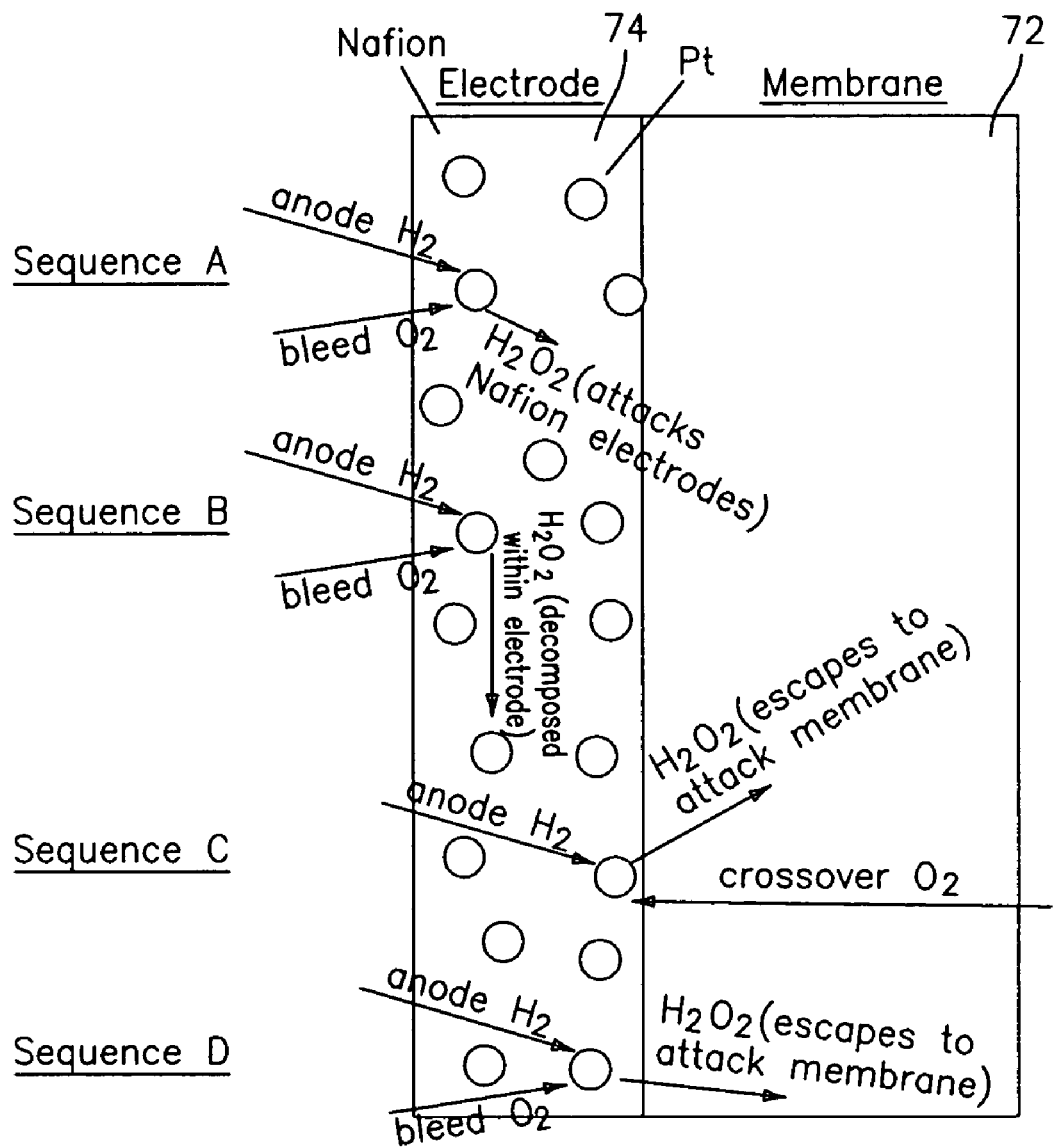
FIG. 7 schematically illustrates different reactions which occur during operation of a fuel cell containing a membrane electrode assembly in accordance with the present invention.

FIG. 7 illustrates various reactions which occur and which can lead to problematic formation of hydrogen peroxide. FIG. 7 shows a portion of a membrane electrode assembly including a membrane 72, and an electrode 74 containing platinum particles as hydrogen oxidation catalyst. FIG. 7 further shows various incoming anode hydrogen and bleed oxygen which in the presence of the platinum particles can generate hydrogen peroxide ($H_2O_2$). The reaction illustrated in sequence A could lead to attack of the actual electrode material. However, in practice, most if not all of such reactions are overcome by the reactions which take place as illustrated in sequence B of FIG. 7, wherein hydrogen peroxide is decomposed within the electrode. However, sequences C and D of FIG. 7 lead to generation of hydrogen peroxide in close proximity to membrane 72, and this leads to the undesirable probability of harmful decomposition of peroxide which is overcome in accordance with the present invention. In these two sequences, when hydrogen meets a platinum particle in close proximity to the membrane and oxygen, either coming from crossover oxygen as in sequence C or in the form of bleed oxygen as shown in sequence D, hydrogen peroxide is formed and can penetrate membrane 72, where decomposition into harmful products results in erosion or consumption of membrane 72.

Benign decomposition of hydrogen peroxide, which is promoted in accordance with the present invention, generally happens within the MEA, and occurs in accordance with the following reactions:

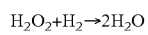

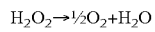

These benign reactions typically occur when hydrogen peroxide decomposes at low and high potentials, respectively, in the presence of platinum. In accordance with the present invention, it has been found that once hydrogen peroxide enters the membrane, in the presence of a species X, which may be an impurity ion or high surface area particulate, the following reaction occurs instead:

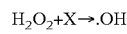

The .OH radical can attack the polymer, or can recombine into hydrogen peroxide, and can further react with hydrogen peroxide to generate other radicals such as .OOH. It is believed that the radicals then attack the membrane, causing consumption or erosion of same. It is further believed that this process is accelerated under dry conditions due to enhanced mechanical stresses that facilitate reaction at the boundaries between the hydrophilic and hydrophobic phases of the membrane.

Positioning of peroxide decomposition catalysts as set forth in the present invention serves to produce the benign decomposition of such hydrogen peroxide into oxygen and water as desired above, and to avoid decomposition of hydrogen peroxide in the presence of any species or impurities of the membrane which lead to radical formation and damage to the membrane.

It should be appreciated that the present invention provides for membrane protection from peroxide decomposition products that can attack the membrane, thus reducing erosion of the membrane and increasing the useful life of the membrane as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A membrane electrode assembly comprising:
   an anode including a hydrogen oxidation catalyst;
   a cathode including a catalyst;
   a membrane disposed between said anode and said cathode; and
   a peroxide decomposition catalyst positioned in at least one position selected from the group consisting of a layer between said anode and said membrane and a layer between said cathode and said membrane, wherein said peroxide decomposition catalyst has selectivity when exposed to hydrogen peroxide toward reactions which form benign products from said hydrogen peroxide, said layer has a porosity of less than or equal to 20%; and
   said layer is less porous than the anode and said layer is less porous than the cathode.

2. The assembly of claim 1, wherein said peroxide decomposition catalyst comprises an element selected from the group consisting of Pt, Pd, Ir, C, Ag, Au, Rh, Ru, Sn, Si, Ti, Zr, Al, Hf, Ta, Nb, Ce and combinations thereof.

3. The assembly of claim 2, wherein said peroxide decomposition catalyst comprises an element selected from the group consisting of Pt, Pd, Ir, C, Ag, Au, Rh, Ru and combinations thereof.

4. The assembly of claim 2, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

5. The assembly of claim 1, wherein said peroxide decomposition catalyst comprises an element selected from the group consisting of Ag, Au, C and combinations thereof.

6. The assembly of claim 5, wherein said peroxide decomposition catalyst is supported on carbon.

7. The assembly of claim 1, wherein said peroxide decomposition catalyst is carbon.

8. The assembly of claim 1, wherein said peroxide decomposition catalyst is present as said layer disposed between said anode and said membrane.

9. The assembly of claim 1, wherein said layer is electrically connected to at least one of said anode or said cathode.

10. The assembly of claim 8, further comprising a layer of said peroxide decomposition catalyst between said membrane and said cathode.

11. The assembly of claim 8, wherein said layer further comprises additional hydrogen oxidation catalyst.

12. The assembly of claim 1, wherein said peroxide decomposition catalyst is further included in said membrane.

13. The assembly of claim 12, wherein said peroxide decomposition catalyst is impregnated into said membrane from a surface of said membrane to a desired depth into said membrane.

14. The assembly of claim 12, wherein said membrane has an anode surface and a cathode surface and wherein said peroxide decomposition catalyst is disposed in said membrane at said anode surface and said cathode surface whereby peroxide generated at either of said anode and said cathode is decomposed in the presence of said peroxide decomposition catalyst.

15. The assembly of claim 1, wherein said peroxide decomposition catalyst is further disposed in at least one of said anode and said cathode.

16. The assembly of claim 15, wherein said peroxide decomposition catalyst is further disposed in both said anode and said cathode.

17. The assembly of claim 16, wherein said anode contains a greater concentration of said peroxide decomposition catalyst than said cathode.

18. The assembly of claim 17, wherein said anode is more hydrophilic than said cathode.

19. The assembly of claim 16, wherein said layer of said peroxide decomposition catalyst is disposed between said anode and said membrane.

20. The assembly of claim 1, wherein said peroxide decomposition catalyst is adjacent to said anode.

21. A membrane electrode assembly comprising:
an anode including a hydrogen oxidation catalyst;
a cathode including a catalyst;
a membrane disposed between said anode and said cathode; and
a peroxide decomposition catalyst positioned in at least one position selected from the group consisting of a layer between said anode and said membrane and a layer between said cathode and said membrane, wherein said layer has a porosity of less than or equal to 20%, wherein said peroxide decomposition catalyst has selectivity when exposed to hydrogen peroxide toward reactions which form benign products from said hydrogen peroxide, and wherein said peroxide decomposition catalyst comprises an element selected from the group consisting of Pd, Ir, C, Ag, Au, Rh, Ru, Sn, Si, Ti, Zr, Al, Hf, Ta, Nb, Ce and combinations thereof; and,
said layer is less porous than the anode and said layer is less porous than the cathode.

22. The assembly of claim 21, wherein said peroxide decomposition catalyst comprises an element selected from the group consisting of Pd, Ir, C, Ag, Au, Rh, Ru and combinations thereof.

23. The assembly of claim 21, wherein said peroxide decomposition catalyst comprises an element selected from the group consisting of Ag, Au, C, and combinations thereof.

24. The assembly of claim 21, wherein said peroxide decomposition catalyst is supported on a support selected from the group consisting of oxides of Ru, Sn, Si, Ti, Zr, Al, Hf, Ta, Nb, or Ce, zeolites, carbon and combinations thereof.

25. A power-producing fuel cell system, comprising a plurality of fuel cells arranged in a fuel cell stack, wherein said fuel cells comprise a membrane electrode assembly comprising:
an anode including a hydrogen oxidation catalyst;
a cathode including a catalyst;
a membrane disposed between said anode and said cathode; and
a peroxide decomposition catalyst positioned in at least one position selected from the group consisting of a layer between said anode and said membrane and a layer between said cathode and said membrane, wherein said layer has a porosity of less than or equal to 20%, and wherein said peroxide decomposition catalyst has selectivity when exposed to hydrogen peroxide toward reactions which form benign products from said hydrogen peroxide; and,
said layer is less porous than the anode and said layer is less porous than the cathode.

26. The assembly of claim 25, wherein said peroxide decomposition catalyst comprises an element selected from the group consisting of Pt, Pd, Ir, C, Ag, Au, Rh, Ru, Sn, Si, Ti, Zr, Al, Hf, Ta, Nb, Ce and combinations thereof.

27. The assembly of claim 26, wherein said peroxide decomposition catalyst comprises an element selected from the group consisting of Pt, Pd, Ir, C, Ag, Au, Rh, Ru and combinations thereof.

28. The assembly of claim 26, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

29. The assembly of claim 25, wherein said peroxide decomposition catalyst comprises an element selected from the group consisting of Ag, Au, C and combinations thereof.

30. The assembly of claim 29, wherein said peroxide decomposition catalyst is supported on carbon.

31. The assembly of claim 25, wherein said peroxide decomposition catalyst is carbon.

32. A process for operating a fuel cell comprising the steps of:
providing a fuel cell including a membrane electrode assembly comprising an anode including a hydrogen oxidation catalyst; a cathode including a catalyst; a membrane disposed between said anode and said cathode; and a peroxide decomposition catalyst positioned in at least one position selected from the group consisting of a layer between said anode and said membrane and a layer between said cathode and said membrane, wherein said peroxide decomposition catalyst has selectivity when exposed to hydrogen peroxide toward reactions which form benign products from said hydrogen peroxide, said layer has a porosity of less than or equal to 20%; and said layer is less porous than the anode and said layer is less porous than the cathode; and feeding a hydrogen-containing fuel to said anode and an oxygen source to said cathode so as to operate said fuel cell and generate hydrogen peroxide in the presence of said peroxide decomposition catalyst whereby said hydrogen peroxide is decomposed to said benign products.

33. The process of claim 32, wherein said peroxide decomposition catalyst comprises an element selected from the group consisting of Pt, Pd, Ir, C, Ag, Au, Rh, Ru, Sn, Si, Ti, Zr, Al, Hf, Ta, Nb, Ce and combinations thereof.

34. The process of claim 33, wherein said peroxide decomposition catalyst comprises an element selected from the group consisting of Pt, Pd, Ir, C, Ag, Au, Rh, Ru and combinations thereof.

35. The process of claim 33, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

36. The process of claim 32, wherein said peroxide decomposition catalyst comprises an element selected from the group consisting of Ag, Au, C and combinations thereof.

37. The process of claim 36, wherein said peroxide decomposition catalyst is supported on carbon.

38. The process of claim 32, wherein said peroxide decomposition catalyst is carbon.

39. The assembly of claim 21, wherein said peroxide decomposition catalyst is positioned adjacent to at least one of said anode and said cathode.

40. The assembly of claim 25, wherein said peroxide decomposition catalyst is positioned adjacent to at least one of said anode and said cathode.

41. The process of claim 32, wherein said peroxide decomposition catalyst is positioned adjacent to at least one of said anode and said cathode.

42. The assembly of claim 1, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

43. The assembly of claim 25, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

44. The process of claim 32, wherein said peroxide decomposition catalyst is supported on a support selected from the group consisting of oxides of Ru, Sn, Si, Ti, Zr, Al, Hf, Ta, Nb or Ce, zeolites, carbon and combinations thereof.

45. The assembly of claim 1, wherein said peroxide decomposition catalyst is present as said layer disposed between said cathode and said membrane.

46. The assembly of claim 1, wherein said hydrogen oxidation catalyst is different from said peroxide decomposition catalyst.

47. The assembly of claim 21, wherein said hydrogen oxidation catalyst is different from said peroxide decomposition catalyst.

48. The system of claim 25, wherein said hydrogen oxidation catalyst is different from said peroxide decomposition catalyst.

49. The process of claim 32, wherein said hydrogen oxidation catalyst is different from said peroxide decomposition catalyst.

50. A power-producing PEM fuel cell system comprising:
a plurality of fuel cells arranged in a fuel cell stack, a source of oxidant and a source of gas phase hydrogen-containing fuel which feed said oxidant and said gas phase hydrogen-containing fuel to said fuel cell stack, wherein said fuel cells comprise a membrane electrode assembly comprising:
an anode including a hydrogen oxidation catalyst;
a cathode including a catalyst;
a membrane disposed between said anode and said cathode; and
a peroxide decomposition catalyst positioned in at least one position selected from the group consisting of a layer between said anode and said membrane and a layer between said cathode and said membrane, wherein said layer has a porosity of less than or equal to 20%, and wherein said peroxide decomposition catalyst has selectivity when exposed to hydrogen peroxide toward reactions which form benign products from said hydrogen peroxide; and,
said layer is less porous than the anode and said layer is less porous than the cathode.

51. A process for operating a PEM fuel cell comprising the steps of:
providing a PEM fuel cell including a membrane electrode assembly comprising an anode including a hydrogen oxidation catalyst; a cathode including a catalyst; a membrane disposed between said anode and said cathode; and a peroxide decomposition catalyst positioned in at least one position selected from the group consisting of a layer between said anode and said membrane and a layer between said cathode and said membrane, wherein said peroxide decomposition catalyst has selectivity when exposed to hydrogen peroxide toward reactions which form benign products from said hydrogen peroxide, said layer has a porosity of less than or equal to 20%; and said layer is less porous than the anode and said layer is less porous than the cathode; and feeding a gas phase hydrogen-containing fuel to said anode and a gas phase oxygen source to said cathode so as to operate said fuel cell and generate hydrogen peroxide in the presence of said peroxide decomposition catalyst whereby said hydrogen peroxide is decomposed to said benign products.

\* \* \* \* \*